March 10, 1931.    E. J. S. SWANSON    1,795,522
CONDUIT FITTING
Filed Aug. 7, 1926
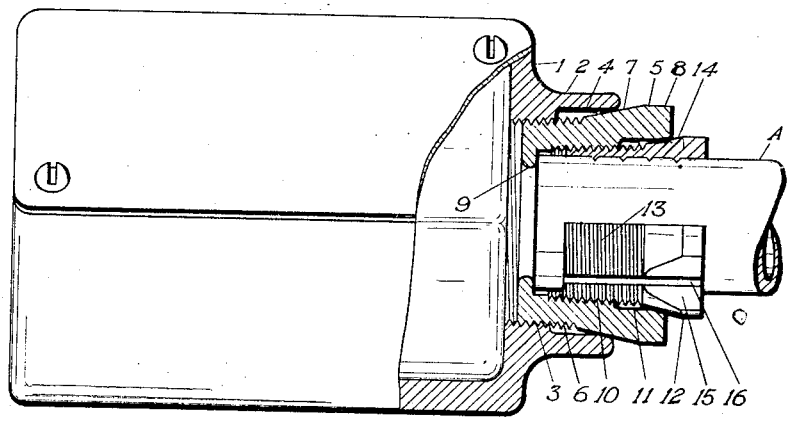
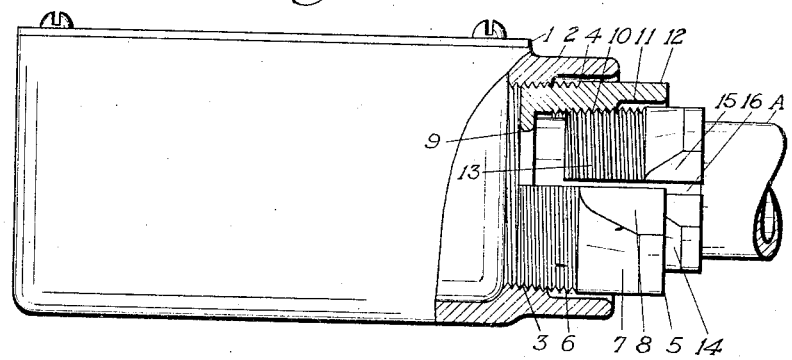
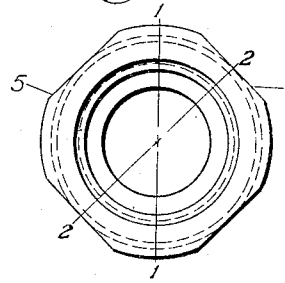
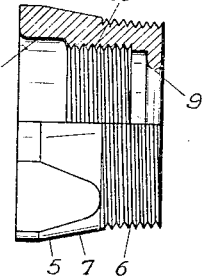
Elmer J. S. Swanson
INVENTOR.
BY
ATTORNEYS.

Patented Mar. 10, 1931

1,795,522

UNITED STATES PATENT OFFICE

ELMER J. S. SWANSON, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed August 7, 1926. Serial No. 127,806.

In the use of conduit fittings it is frequently desirable to reduce the size of the opening of the fitting so as to connect it with a smaller conduit than the opening to the fitting. The present invention is designed to accomplish this purpose with relation to a conduit fitting in which there is an opening, an outer annular part engaging a contractible sleeve having an inner screw-threaded end, an intermediate wedging portion, and an outer wrench-hold. Features and details of the invention will appear from the specification and claims.

The invention is illustrated in the accompanying drawings as follows:—

Fig. 1 shows a side elevation, partly in section, on the line 1—1 in Fig. 3.

Fig. 2 a similar elevation, partly in section, on the line 2—2 in Fig. 3.

Fig. 3 an end view of the reducing member.

Fig. 4 a side elevation, partly in section, of the reducing member.

1 marks the body of the fitting which, as shown, is in the form of a conduit box but such form is merely shown to exemplify the invention and the invention is not limited to this form of body. The body has an extension 2 having internal threads 3 at its inner end and an annular wedging surface 4 at its outer end.

A reducing member 5 is externally screw threaded at 6 at its inner end, has an intermediate wedging portion 7 and an outer wrench-hold portion 8. It is provided with an internal lip 9 at its inner end forming a guard for an inserted conduit A. The reducing member is provided with internal screw threads 10 at its inner end and the annular wedging surfaces 11 at its outer end.

A contractible sleeve 12 is arranged in the reducing member. The sleeve has external screw threads 13 at its inner end adapted to screw into the threads 10 of the reducing member, an intermediate wedging portion 14 adapted to engage the wedging portion 11 of the reducing member and a wrench-hold portion 15 at its outer end, preferably provided with flats by means of which the sleeve may be screwed to place. The sleeve is provided with a slot 16 which renders it readily contractible. It will be noted that the extension 2 is adapted to receive a threadless conduit securing means such as exemplified in the application of Howard A. Selah, #54,775, filed Sept. 5th, 1925.

What I claim as new is:—

1. In a conduit fitting, the combination of a body having an opening having an inner portion of the wall of the opening screw-threaded, and an outer portion of said wall of the opening unthreaded; a reducing member having an inner portion screw threaded, an intermediate portion unthreaded and an outer portion provided with a wrench-hold, said threaded portions being screwed together and said unthreaded portions having wedging surfaces in wedging engagement and said reducing member having a conduit receiving opening therein; and a conduit securing means arranged within the reducing member.

2. In a conduit fitting, the combination of a body having an opening having an inner portion of the wall of the opening screw threaded and an outer portion of said wall of the opening unthreaded; a reducing member having an inner portion screw threaded, an intermediate portion unthreaded and an outer portion provided with a wrench-hold, said threaded portions being screwed together and said unthreaded portions having wedging surfaces in wedging engagement and said reducing member having a conduit receiving opening therein; and a threadless conduit securing means comprising a slotted sleeve arranged within the reducing member.

3. A conduit fitting comprising a body having an opening having an inner portion of the wall of the opening screw threaded and an outer portion of said wall of the opening unthreaded; a reducing member having an inner end screw threaded, an intermediate portion unthreaded and an outer portion forming a wrench-hold, said threaded portions being screwed together and said unthreaded portions having wedging surfaces in wedging engagement with each other, said reducing member having a conduit receiving opening having screw threads at its inner end and an unthreaded portion at its outer end; and a contractible sleeve in the reducing member opening having a screw-threaded inner end, an unthreaded intermediate portion, and a wrench-hold portion at its outer end, said sleeve being slotted to render it contractible.

4. A conduit fitting comprising a body having a conduit receiving opening; a reducing member in the opening, said reducing member having a conduit receiving opening therein, said reducing member opening being screw-threaded at its inner end and having an unthreaded portion at its outer end; and a contractible sleeve arranged in the reducing member opening, said sleeve having a screw-threaded inner end, an unthreaded intermediate portion, and a wrench-hold portion at its outer end, said threaded portions being screwed together and said unthreaded portions having wedging surfaces in wedging engagement, said sleeve being slotted to render it contractible.

5. A conduit fitting in the form of a tube having an inner externally screw-threaded end, an intermediate wedging surface and a wrench-hold, said fitting having an interior screw thread at its inner end and an interior wedging surface at its outer end.

In testimony whereof I have hereunto set my hand.

ELMER J. S. SWANSON.